United States Patent [19]

Buchert et al.

[11] 4,260,353

[45] Apr. 7, 1981

[54] APPARATUS FOR PRODUCING RECTANGULAR BLOCKS OF FOAMED RESINS

[75] Inventors: Dieter Buchert, Berkheim; Karl-Heinz Stelzer, Memmingen, both of Fed. Rep. of Germany

[73] Assignee: Metzeler Schaum GmbH, Memmingen, Fed. Rep. of Germany

[21] Appl. No.: 78,689

[22] Filed: Sep. 25, 1979

[30] Foreign Application Priority Data

Sep. 27, 1978 [DE] Fed. Rep. of Germany ....... 2841943

[51] Int. Cl.³ .............................................. B29D 27/04
[52] U.S. Cl. ..................................... 425/224; 264/51; 264/DIG. 84; 425/817 C
[58] Field of Search .................... 264/54, 51, DIG. 84; 425/89, 224, 817 C

[56] References Cited

U.S. PATENT DOCUMENTS

| | | | |
|---|---|---|---|
| 3,081,487 | 3/1963 | Heffner et al. | 264/54 X |
| 3,197,531 | 7/1965 | Wilbur | 264/54 X |
| 3,632,706 | 1/1972 | Muller | 264/DIG. 84 |
| 3,906,068 | 9/1975 | Hanusa | 264/DIG. 84 |

FOREIGN PATENT DOCUMENTS

| 1411517 | 10/1975 | United Kingdom | 264/DIG. 84 |
|---|---|---|---|
| 1450093 | 9/1976 | United Kingdom | 425/817 C |

*Primary Examiner*—Philip Anderson
*Attorney, Agent, or Firm*—Herbert L. Lerner

[57] ABSTRACT

In a method of producing blocks of a foamable reaction mixture having an adjustable surface and sharp edges wherein the reaction mixture is discharged from a mixing chamber onto a forwardly moving surface path in a continuous mass of varying height, the improvement therein includes applying forces to the discharging mass opposing formation of differences in the height thereof.

13 Claims, 14 Drawing Figures

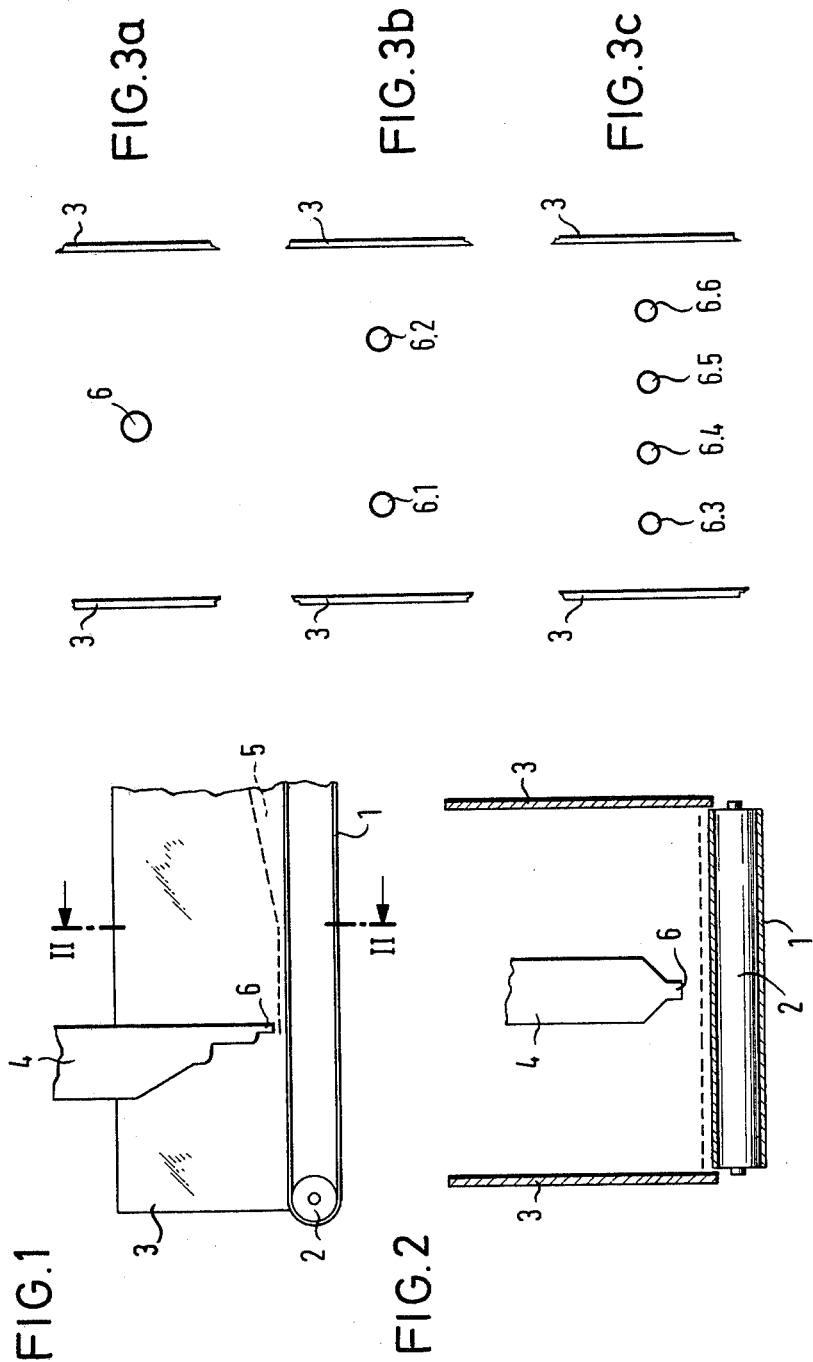

FIG. 4a
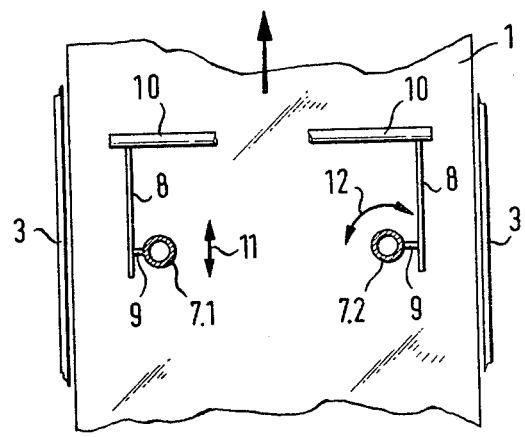
FIG. 4b
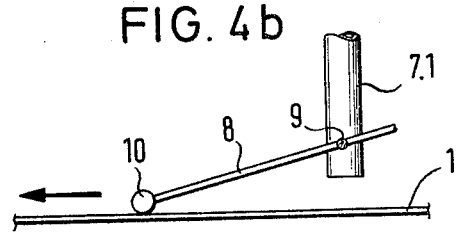
FIG. 5a  FIG. 5b  FIG. 5c
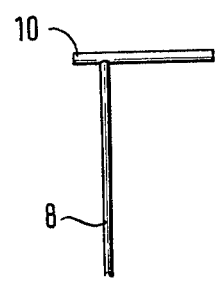 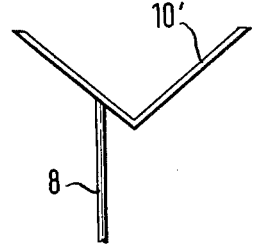 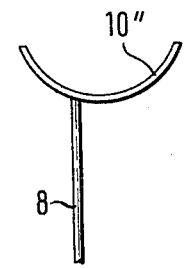

APPARATUS FOR PRODUCING RECTANGULAR BLOCKS OF FOAMED RESINS

The invention relates to an apparatus for producing rectangular or parallelepipedal blocks of foamable reaction mixture, such as a polyurethane mixture, especially, and to a device for performing the method. The production of foam blocks with very even or planar surfaces and sharp edges by using the conventional so-called rectangular method should thereby be possible.

In the heretofore known rectangular method, wherein side roundness can indeed be sharply reduced, depressions are formed generally at the top surface parallel to the block side, so that the actual cross section of the block that is produced is quite far yet from an exact rectangle and, therefore, use of the full height of the block is reduced.

In the foaming process, as is known, the reaction mixture to be foamed applied from a mixing chamber onto a forwardly moving bottom web or track whereon the mixture is then foamed between two suitable lateral conveyor-belt limits.

Various methods of improving the thus-produced block shape with regard to the formation of a rectangle have been proposed heretofore, for example, by Draka or Petzetakis. The methods of Draka and Petzetakis are based upon drawing up the side walls of a block up to the level or height of the middle of the block.

These methods also result in an unsatisfactory rectangular shape, however, because the side walls can be made higher toward the middle of the block only with limited effectiveness. The natural side roundness of a noncontrolled or noninfluenced foaming block extends about 15 to 20 cm toward the middle of the block whereas the upward drawing of the side walls is generally effective for about 5 to 7 cm. Consequently, at a given spacing from the edges of the block, a respective zone is formed in the block wherein the block height is less than at the sides and the middle of the block. This means, in other words, that the upper block surface is uneven or nonplanar.

The so-called "Fomax" method is also used for foaming blocks and represents a reversal in the methods of Draka and Petzetakis. In the Fomax process, the foam at the side limits of the block is permitted to slide downwardly. In order to achieve this, the prefoamed mixture is applied from a trough disposed along the width or breadth of the machine onto the downwardly inclined foam underlay by flowing over.

Also with the latter mode of operation, a moundlike surface with slight side rounding is produced. Furthermore, with this heretofore known method, it is impossible to vary the width or breadth of the blocks during foaming whereas this is permitted by the other heretofore known methods.

In order to foam rectangular blocks various highly costly machines with cover webs or tracks have therefore been developed, the constructions of which have the disadvantage that variations in breadth or width during foaming is possible only within very limited ranges. Furthermore, in spite of rectangular shape, the full use of the block height is reduced due to faults below the cover web resulting from air occlusions.

It is accordingly an object of the invention to provide a device for producing rectangular blocks of foam material which afford evening or smoothing-out of normally developing differences in height within the cross section of the block during the free foaming which occurs in a suitable rectangular process, and thereby achieve an even or planar upper block surface.

With the foregoing and other objects in view, there is provided, in accordance with the invention, an apparatus for producing blocks of a foamable reaction mixture having an adjustable surface and sharp edges wherein the reaction mixture is discharged from a mixing chamber onto a forwardly moving surface path in a continuous mass of varying height, an improvement which comprises applying forces to the discharging mass opposing formation of differences in the height thereof. It was found, namely, that the shape of the block could be controlled over the width or breadth of the block by a suitable distribution of the reaction mixture to be foamed so that the normally occurring variations in height are counteracted and these height variations are accordingly fully equalized or compensated.

In accordance with another mode of the invention, the method comprises controlling or influencing the equalization or compensation by simple mechanical deflecting units which deflect the foam mixture flowing onto the foam underlay or underlying surface in a manner that, depending upon the choice and position of the deflecting units, specific block zones are favored in the height thereof or are disadvantages or discriminated against.

In accordance with a further mode, the method of the invention includes subdividing the mass of the reaction mixture in metered quantities over a distance corresponding to the width of the blocks being foamed.

In accordance with an added mode, the method of the invention more particularly includes backwardly deflecting the reaction-mixture mass on the forwardly moving surface path immediately after the mass is discharged onto the forwardly moving surface path.

In accordance with another aspect of the invention, there is provided a device for producing rectangular blocks of foamable reaction mixture by the foregoing method comprising outlet means for discharging the reaction mixture from a stationary mixing chamber onto a forwardly moving surface path, the outlet means being subdivided into a plurality of outlet openings over a distance corresponding to the width of blocks to be foamed.

In accordance with a further feature of the invention, the outlet means comprise four outlets for providing a good material distribution when the width of the blocks is relatively large. In accordance with an alternate feature of the invention, however, the outlet means comprise two outlets with which a good rectangular shape of the foam block can be produced while affording the advantage of an improved cleaning capability.

In the case of large discharges from the outlets, according to an added feature of the invention, the ends of the outlets have a widened cross section and are provided with screens to prevent defects resulting from discharge flow velocities which are too high.

To suitably distribute the reaction mixture as it discharges from the outlets, there is provided, in accordance with an additional feature of the invention, a respective mechanically acting deflecting unit disposed perpendicularly to the direction of travel of the forwardly moving surface path in front of each of the outlets in foam direction.

In accordance with a specific feature of the invention, the deflecting unit, in the simplest construction thereof, is in the form of a rod having a circular cross section which is disposed on the foam underlay or underlying surface of a bottom web extending transversely to the direction of conveyance and which brakes the outwardly flowing mixture and laterally deflects part of the mixture. Further, in accordance with alternate features of the invention, the deflecting unit has a flat section or a triangular section.

In accordance with yet another feature of the invention, the outlets have respective outlet openings through which the reaction mixture is discharged, the deflecting units being disposed so as to be variable in spacing from the respective outlet openings and so as to be turnable.

In accordance with additional alternate features of the invention, the deflecting unit is arcuate, elliptical or hyperbolic in shape.

In accordance with a further feature of the invention, the deflecting unit is disposed relative to the respective outlet so as to act on only part of the foam mixture discharging therefrom.

In accordance with an added feature of the invention, the deflecting unit is disposed relative to the respective outlet so as to deflect the mixture backwardly immediately after it is discharged from the respective outlet.

In accordance with an additional feature of the invention, the respective deflecting unit is directly secured to the respective outlet.

In accordance with a concomitant feature of the invention, the respective outlet has an end, and the respective deflecting unit is secured thereto, the outlet end being turnable, and the respective deflecting unit being turnably entrained therewith.

Other features which are considered as characteristic for the invention are set forth in the appended claims.

Although the invention is illustrated and described herein as embodied in a method of producing rectangular blocks of foam material and device for performing the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a diagrammatic fragmentary side elevational view with one of the side walls thereof removed of a foam production plant according to the invention;

FIG. 2 is a cross-sectional view of FIG. 1 taken along the line II—II in direction of the arrows;

FIGS. 3, 3b and 3c are highly diagrammatic bottom plan views respectively, of FIG. 2 showing three different embodiments of the invention as seen from above the conveyor belt and showing one, two and four outlets, respectively, from an otherwise non-illustrated mixing chamber thereof;

FIG. 4a is a fragmentary top plan view of the foam production plant showing two mixing-chamber outlets in section, with the mixing chamber omitted, and further including deflecting units in connection with the respective mixing-chamber outlets;

FIG. 4b is a side elevational view of the foam production plant with the side walls removed and as seen from the left-hand side of FIG. 4a;

FIGS. 5a, 5b and 5c are fragmentary views of FIG. 4a showing different embodiments of the deflecting units;

Figure 6A:
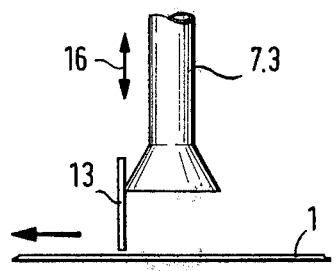
Figure 7A:
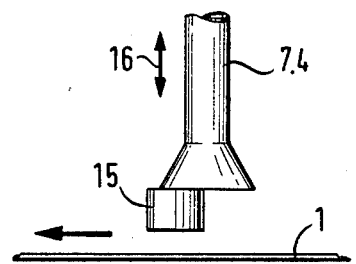
Figure 6B:
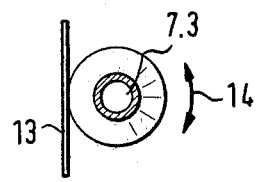
Figure 7B:
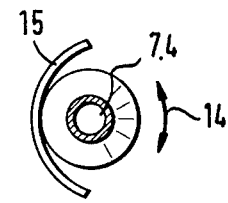

FIGS. 6a and 6b are fragmentary elevational and horizontal sectional views of a mixing-chamber outlet with a straight diaphragm or shield as deflecting unit; and FIGS. 7a and 7b are views corresponding to those of FIGS. 6a and 6b, respectively, of a mixing-chamber outlet with a curved diaphragm or shield as deflecting unit.

Referring now to the drawing and first, particularly, to FIGS. 1 and 2 thereof, there is shown therein a conventional foam production plant having a bottom endless conveyor belt 1 which serves as foam underlay for a continuously practised foaming process. The endless conveyor belt is guided around a guide roller 2. Conveyor-belt limiting walls 3 perform the function of laterally defining the foam blocks that are being produced. The limiting walls 3 are, in turn, continuously advanced together with the bottom conveyor belt 1 in a conventional manner, for example, by themselves being endless belts continuously advanced over non-illustrated rollers having vertical axes perpendicular to the axis of the roller 2, or by having guiding belts conducted in front thereof.

The mixture 5 to be foamed is delivered through an outlet 6 onto the conveyor belt 1 and continuously foams as it is conveyed along the conveyor path as indicated by the broken line at the right-hand side of FIG. 1.

In accordance with the invention, it is advisable to provide several outlets depending upon the width of the foam blocks that are to be foamed. This is shown in FIGS. 3b and 3c. In this connection, FIG. 3b shows that it is sufficient, in many cases, to dispose two outlets 6.1 and 6.2 over the width or breadth between the lateral limiting walls 3, whereas, in FIG. 3c, there is graphically represented that an optimal control of the mixture that is to be foamed, within the sense of the method according to the invention, is possible with four outlets 6.3, 6.4, 6.5 and 6.6, which are disposed in a uniform distribution or at least symmetrically to the center line of the bottom belt 1 over the width or breadth thereof between the lateral conveyor-belt limiting walls 3.

As is apparent from FIG. 4a, which is a diagrammatic top plan view of the bottom conveyor belt 1 with the lateral limiting belts 3, a deflecting unit 10 is associated, in accordance with the invention, with each individual outlet 7.1 and 7.2 and is fastened by means of a respective fastening rod 8 and a link or joint 9 directly to the respective outlet tubes 7.1 and 7.2.

FIG. 4b is a diagrammatic side elevational view of the outlet 7.1 connected to the respective deflecting unit 10.

Depending upon the width or breadth to be foamed and upon the number of outlets, the deflecting unit 10 must have a suitably selected distinctive width or breadth. For large or heavy outputs or production, it is advantageous to select a sturdier section or profile than a circular rod 10 as shown in FIGS. 4a and 4b. Instead of the circular rod 10, rectangular, triangular or even trapezoidal sections or profiles can be used i.e. can be carried on the bottom belt or web 1 directly for deflecting.

In order also to be able to smooth out final unevennesses in the foamed mixture with the method according to the invention, there is proposed, in accordance with another feature of the inventive concept, to dispose the deflecting units 10 so that they are displaceable relative to one another in longitudinal direction of the bottom belt 1 as indicated by the arrow 11 in FIG. 4a. The deflecting units 10 are also advantageously fastened so as to be turnable as indicated by the curved arrow 12 at the outlet 7.2 shown at the right-hand side of FIG. 4a, because it is possible thereby to suitably influence or control the distribution of the foam mixture toward the lateral limits 3 or toward the middle by disposing the deflecting unit 10 slightly cross-wise or transversely to the travel direction of the belt 1 as indicated by the unidentified vertical arrow in FIG. 4a and horizontal arrow in FIG. 4b.

Within the scope or confines of the invention, it may also be advantageous for particular foam mixture to use deflecting sections or profiles having more advantageous flow-engineering characteristics instead of any section or profile of a simple rod 10. This is represented in FIGS. 5b and 5c wherein there is shown, respectively, a roof-shaped section or profile 10; effective either in or also against direction of flow of the foam mixture or an arcuate section or profile 10" opening either in or against the flow direction, as compared to the hereinaforementioned simple straight rod 10 shown again in FIG. 5a.

Especially in cases of large or heavy outputs or production, it has been found to be advantageous to dimension the section or profile of the deflecting unit in a manner that part of the foam mixture can flow over the deflecting unit.

With foam mixtures which foam relatively rapidly and which pass rapidly through the liquid phase, it is advantageous, in accordance with another feature of the invention, to divert or reverse the mixture on the foam underlay 1 directly after it leaves the outlet and to control or influence it especially also in a direction opposite the foam direction. This is effected at its simplest with the aid of a diaphragm or shield which is applied directly at the outlet in direction of conveyor displacement. This diaphragm or shield, as represented graphically in FIGS. 6a and 6b, can be in the form of a straight or planar diaphragm or shield 13 which is fastened directly to the outlet 7.3 which, in the case of FIGS. 6a and 6b has an outwardly flaring cross section. Since it has been found to be advantageous, in various cases, not to control or influence the entire outlet thickness of the outlet mixture, the outlet 7.3, as indicated by the double-headed arrow 16 is adjustable in height, so that the diaphragm or shield 13 can be seated directly on the bottom belt 1 or can be made effective raised somewhat therefrom. The outlet 7.3 is also turnably fastened, as shown in FIG. 6b and indicated by the double-headed curved arrow 14, so that the in-itself straight or planar diaphragm or shield 13 can be adjusted also at a given angle to perpendiculars to the longitudinal extension of the bottom conveyor belt 1 in order to control the distribution of the material flow accordingly.

FIGS. 7a and 7b show that an arcuate or curved diaphragm or shield 15 can also be provided advantageously, which strips back at least part of the discharging mixture against the direction of conveyance represented by the horizontal arrow in FIG. 7a, in order thereby to control the height of the foam accordingly. The diaphragm or shield 15 can thereby have the form of a circular section, an elliptical section or also a parabola. To adjust to the correct effect upon the respective foam-block zone, the diaphragm or shield 15 is disposed, in this case also, so as to be turnable about the axis of the outlet as indicated by the double-headed curved arrow 14 in FIG. 7b.

In order to be able to control the intensity of the action for high or heavy outputs, the diaphragm or shield 15 can be adjusted in height also in this case so that a gap of varying size can be set between the bottom belt 1 and the lower edge of the diaphragm or shield 15. It is possible thereby, depending upon the requirements, to deflect or divert backwardly either the entire quantity of foam mixture flowing out of the outlet 7.4 or only an arbitrarily selected part thereof. Since changes in the width or breadth of the blocks to be foamed must usually be effected also during the foaming operation, it is advisable to dispose the outlets 7.4 symmetrically to the middle of the conveyor belt 1 and so as to be continuously adjustable in spacing therebetween.

The invention has been explained with respect to several concrete features thereof. Since very many variations in foam production exist with different degrees of difficulty for manufacturing blocks thereof, different embodiments of the features disclosed herein in particular can be appropriate. Especially difficult are generally the light, soft types of blocks with low mixture viscosities and small output. In such a case, it has been found to be advantageous to combine the features of FIGS. 4 and 7 accordingly.

It is of course quite obvious that, with the hereinafore described features, the surface of a block being produced can also be influenced or controlled so that an exactly defined uneven surface contour is formed, if such a contour should be desired in a particular case.

There are claimed:

1. Device for producing rectangular blocks of foamable reaction mixture according to a method which includes discharging the reaction mixture from a mixing chamber onto a forwardly moving surface path in a continuous mass of varying height and applying forces to the discharging mass opposing formation of differences in height thereof, comprising outlet means for discharging the reaction mixture from the mixing chamber onto the forwardly moving surface path, said outlet means being subdivided over a distance corresponding to the width of the blocks to be foamed, said outlet means comprising a plurality of outlets for the reaction mixture mutually spaced over the width of the blocks to be foamed, and a respective mechanically acting deflecting unit disposed perpendicularly to the direction of travel of said forwardly moving surface path in front of each of said plurality of outlets in foam direction, said deflecting unit being disposed relative to the respective outlet so as to deflect the mixture backwardly immediately after it is discharged from the respective outlet.

2. Device according to claim 1 wherein said outlet means comprise two outlets for the reaction mixture mutually spaced over the width of the blocks to be foamed.

3. Device according to claim 1 wherein said outlet means comprise four outlets for the reaction mixture mutually spaced over the width of the blocks to be foamed.

4. Device according to claim 1 wherein said deflecting unit has a circular-rod section.

5. Device according to claim 1 wherein said deflecting unit has a flat section.

6. Device according to claim 1 wherein said deflecting unit has a triangular section.

7. Device according to claim 1 wherein said outlets have respective outlet openings through which the reaction mixture is discharged, said deflecting units being disposed so as to be variable in spacing from the respective outlet openings and so as to be turnable.

8. Device according to claim 1 wherein said deflecting unit is arcuate in shape.

9. Device according to claim 1 wherein said deflecting unit is elliptical in shape.

10. Device according to claim 1 wherein said deflecting unit is hyperbolic in shape.

11. Device according to claim 1 wherein said deflecting unit is disposed relative to the respective outlet so as to act on only part of the foam mixture discharging therefrom.

12. Device according to claim 1 wherein the respective deflecting unit is directly secured to the respective outlet.

13. Device according to claim 12 wherein the respective outlet has an end, and the respective deflecting unit is secured thereto, said outlet end being turnable, and the respective deflecting unit being turnably entrained therewith.

* * * * *